United States Patent Office 3,101,210
Patented Aug. 20, 1963

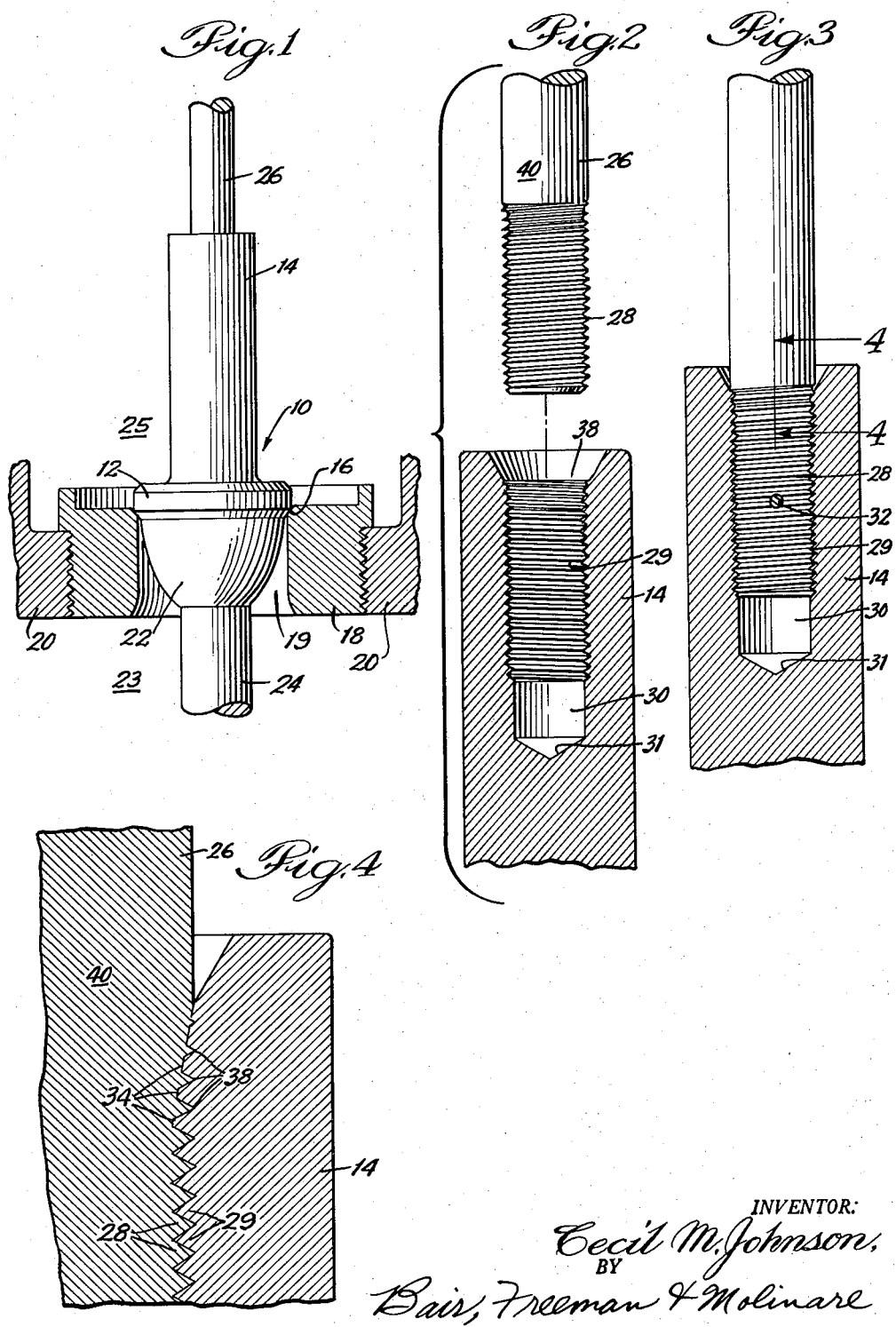

3,101,210
VALVE STEM CONNECTION
Cecil M. Johnson, Marshalltown, Iowa, assignor to Fisher Governor Company, Marshalltown, Iowa, a corporation of Iowa
Filed Mar. 27, 1961, Ser. No. 98,648
2 Claims. (Cl. 287—125)

This invention relates in general to replaceable valve stems and more particularly to an improved valve stem replacement arrangement in which the load bearing area is materially increased.

In many valve applications the stems are subject to severe operating stress so that they often become deformed or broken. This problem is particularly serious with valves of large sizes. In order to achieve certain economies, therefore, inner valves have been designed with replaceable or interchangeable stems so that the relatively expensive inner valve or valve plug may continue to be used after the stem is replaced. However, such use of interchangeable or replaceable stems is subject to a number of practical problems.

Thus, the practice previously has been either to provide a detachable threaded and pinned connection between the valve stem and the valve, or to sacrifice replacement entirely through the use of a welded assembly of adequate strength. Such former connections were designed so as to "bottom" a conical point of the stem within an internal drilled point of the valve plug as hard as possible and then to cross-drill for the pin which completed the connection. Such methods have been costly and difficult in manufacture, and have been subject to early fatigue failure at the point on the stem where it entered the first thread of the inner valve.

Since the main valve operating load lies along the axis of the valve and stem, it is borne primarily by the relatively small engaged threaded areas. In threaded structures, the leverage factor of the load, and the fatigue induced by vibrational movements are greatest on the last few mating threads. As a result, this area of the threaded connection tends to fail easily. Because it was an objective in such threaded connections to thread the stem as deeply into the valve plug as possible, the valve plug must be provided with a threaded recess whose bottom tapers as smoothly as possible, and a lathe operation on the stem was therefore required, as well as time-consuming inspection procedures for determining that the stem had been threaded into the valve as deeply as possible.

The present invention utilizes a simple concept for avoiding the above disadvantages in threaded valve stem arrangements. Thus, by truncating the last few threads at the top of the valve recess and increasing the root diameter of the stem adjacent the last few threads, it is possible to provide a considerable increase in the load bearing structure in this area. The danger of failure is thus considerably reduced and the need for ensuring that the bottom of the stem is engaged at the bottom of the recess in the valve is completely eliminated. Since it is not necessary to ensure engagement between the end of the stem and the end of the recess, the aforementioned lathe and inspection procedures are also eliminated.

It is, therefore, an object of the present invention to provide an improved valve stem replacement arrangement.

It is a further object of the present invention to provide an improved construction for a threaded valve stem arrangement in which the load bearing structure is materially increased.

It is yet another object of this invention to provide an improved threaded valve stem arrangement which is capable of facile and economical assembly.

Other objects and features of this invention will become apparent on examination of the following specification, claims and drawings: wherein FIG. 1 illustrates a valve in a portion of its operating environment;

FIG. 2 illustrates a portion of the valve and stem structure before assembly;

FIG. 3 illustrates the valve and stem structure after assembly; and

FIG. 4 is a view illustrating the manner in which thread on the stem and valve mate along the portion 4—4 in FIG. 3.

In FIG. 1 the valve and stem assembly is indicated by the reference character 10. The valve or plug is shown at 12 and it is provided with an upwardly projecting portion 14 in which a valve stem is adapted to be assembled. The valve 12 engages against the valve seat 16, which is the appropriately contoured surface on a ring valve seat 18. The ring valve seat 18 defines a port 19 which provides access between two chambers 23 and 25 in a valve body 20. The valve body 20 usually comprises a casting having, for example, internal flanges or ears to which the valve ring seat 18 is assembled either by threading or welding or both. The valve 12 may be provided with an appropriately contoured protusion such as 22 for controlling the rate of flow between the chambers 23 and 25 and from which a rod 24 depends. The rod 24 may be connected, for example, to another valve seated in a similar manner to another valve in another port in the event two valves are to be controlled simultaneously.

A valve stem 26 extends from the projecting portion 14, and is usually appropriately loaded or biased so that the valve 12 is arranged in either a normally open or normally closed position depending on the desired condition until a force overcoming the bias is applied. The force for overcoming the bias may be applied repetitively at short or long intervals, but in either event the valve stem at its junction with the portion 14 is often subject to failure.

In order to reduce the possibility of such failure, the novel type of construction shown in FIGS. 2, 3 and 4 for the valve stem and valve is used. Looking at FIG. 2, it will be seen that the stem 26 is provided with threads 28. As shown at 38 in FIG. 4, it will be seen that the body or shank portion 40 of the stem tapers gradually outwardly to increase the root diameter of the stem adjacent the last few threads. In this way the stem connection is provided which need not be bottomed within the hole of the valve plug. Instead, the threading is stopped by the mating of truncated threads at the outer end of the threaded opening in the valve plug. This taper is preferably made at an acute angle of ten degrees, and is equal both in the internal and external threads of the mating parts. The same threading can be done on a conventional threading machine, rather than a lathe, by using thread chasers with a ten degree throat angle, as best seen in FIG. 4 of the drawing.

Thus, the valve portion 14 is provided with a recess 30 that is normally created by drilling, resulting in the tapered end 31. This recess 30 is also threaded at 29 and the last few threads 34 are truncated at the same angle of about ten degrees.

Therefore, when the stem 26 and the valve portion 14 are assembled, an increased area of contact between the threaded surfaces results at threads 34 and 38 as the body portion 40 of the stem supports and engages with the threads and consequently the ability to withstand stress is considerably increased. It will be noted that the stem 26 need not engage the bottom portion 30 of the recess 31 and the threaded portions of the stem and valve are appropriately terminated, while the need to provide a tapered thread on the stem is eliminated together with the need for determining that the bottom of the thread and recess are engaged.

After the stem is assembled in the valve portion 14, the two are drilled and a pin 31 inserted through the drilled hole in a conventional manner for the purpose of locking the stem 26 in place.

Thus having described an improved replaceable stem arrangement together with a method whereby this is accomplished, but believing that the invention is capable of being practiced in other forms such as the use of external threads on the valve and internal threads on the stem, there is appended hereto a series of claims which are believed to more fully explore the inventive concept.

I claim as my invention:

1. In combination, an externally threaded valve stem member and a valve member having a threaded recess adapted to be detachably connected to said valve stem member, said valve stem member having first threads thereon having a variable root diameter along a portion thereof, with a first line passing through the bottom of each thread root lying at an acute angle of about ten degrees with respect to the longitudinal axis of said valve stem member and other threads having a constant root diameter such that a second line passing through the bottom of each thread root is parallel to the longitudinal axis of said valve stem member, said valve member having first threads and other threads in said recess, each having a constant root diameter, said other threads in said recess having a constant thread diameter, with a line passing through each thread root on said valve member being substantially parallel to said second line, and with a line passing through the outer edge of each first thread on said valve member substantially coinciding with said first line, said first threads of each member engaging one another, said other threads of each member engaging one another, and said first threads of said valve member being truncated, whereby the load bearing characteristics of the connection between the valve stem member and valve member are materially increased.

2. In a connection wherein a first valve stem member having external threads thereon is adapted to be detachably connected to a second valve member having a threaded recess therein, the improvement comprising first threads on said first member having a variable root diameter along a portion thereof with a first line passing through the bottom of each thread root lying at an acute angle with respect to the longitudinal axis of the first member and with other threads on said first member having a constant root diameter such that a second line passing through the bottom of each root is parallel to the longitudinal axis of the first member, and first threads and other threads in said recess of said second member having a constant root diameter, with a line passing through each thread root on said second member being substantially parallel to said second line, and with a line passing through the outer edge of each first thread on said second member substantially coinciding with said first line, said first threads of each member engaging one another, said other threads of each member engaging one another, said first threads of said second member being truncated, whereby the load bearing characteristics of the connection are materially increased.

References Cited in the file of this patent
UNITED STATES PATENTS

| | | |
|---|---|---|
| 859,643 | Cummings | July 9, 1907 |
| 1,973,848 | Duffy | Sept. 18, 1934 |
| 2,045,520 | Davison | June 23, 1936 |
| 2,056,112 | Protin | Sept. 29, 1936 |
| 2,094,491 | Janata | Sept. 28, 1937 |
| 2,940,787 | Goodner | June 14, 1960 |